Patented Apr. 22, 1930

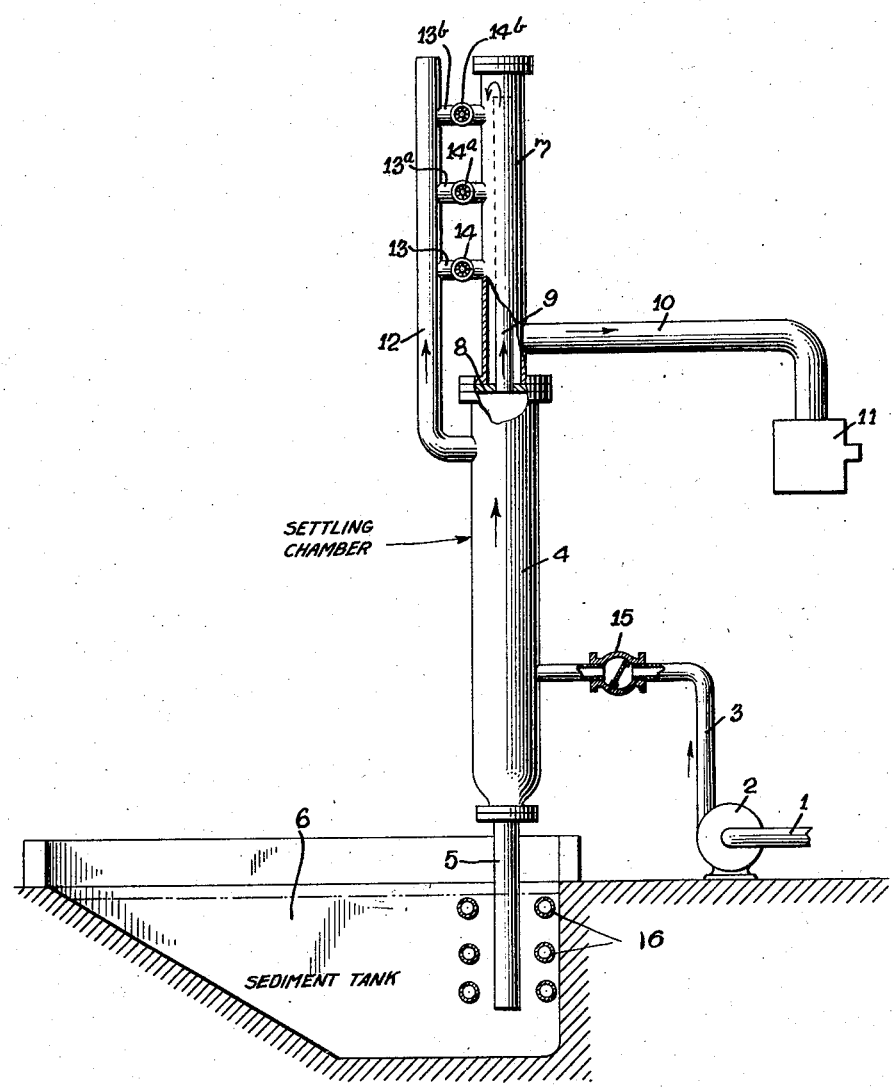

1,755,778

UNITED STATES PATENT OFFICE

JOHN A. GIBB, OF NEW YORK, N. Y., ASSIGNOR TO ZIELEY PROCESSES CORPORATION, OF NEW YORK, N. Y., A CORPORATION OF MAINE

DISTILLATION APPARATUS

Application filed November 20, 1925. Serial No. 70,215.

This invention relates to vacuum distillation apparatus and pertains more particularly to means adapted to separate and collect sediment or other undesirable solid material from the liquid being treated.

It is an object of this invention to provide an apparatus adapted for use in connection with stills of the continuous operation type, which will accomplish such separation expeditiously and effectively and without interference with the distillation process with which it is adapted to be used.

Other objects and advantages of the invention will appear hereinafter.

A preferred embodiment of the invention selected for purposes of illustration is shown in the accompanying drawing, in which, the figure is a semi-diagrammatic view, certain parts being broken away or shown in section to better illustrate the construction and operation thereof.

One of the many practical difficulties encountered in vacuum distillation operations in which stills of the continuous operation type are used, is that caused by the deposit of sediment or other foreign solid matter within the chambers, passages, or tubes of the still. This difficulty is considerably aggravated in those cases in which the oil being distilled is mixed with a certain quantity of caustic soda in order to improve the quality of the distillate. The caustic soda, reacting with certain constituents of the oil, forms a soap which, when subjected to certain degrees of heat, decomposes and forms a solid substance in the oil known as soda coke. Unless removed from the oil this soda coke accumulates and obstructs the passages and conduits of the still to such an extent that it frequently becomes necessary to shut down the still for cleaning.

According to the present invention it is proposed to insert between certain sections of the still separating units by means of which such solid matter may be removed from the oil, and such separating units may preferably be inserted at or beyond the point in the still where the heat applied is sufficient to cause the decomposition of the soap and resulting deposit of soda coke above described.

In the preferred embodiment of the invention particularly described herein a separating unit is adapted to be inserted between two sections of a continuous process still in which the oil flows in a continuous stream from an intake header to residue receivers, suitable offtake outlets being provided at various points along the course of the stream for the removal of vapors. The stills adapted for use in connection with the particular form of the invention described herein may be maintained under vacuum, preferably a high vacuum of 28" or 29" or more. The still structure will not be further described in detail herein as it forms no part of the present invention.

Referring to the drawing, the oil residue emerging from the first still section passes through the conduit 1 and is forced by the pump 2 driven by an electric motor or other suitable source of power through the conduit 3 into the enlarged settling chamber 4. As this chamber is of much larger diameter and capacity than the conduits entering and leaving it, a relatively quiet body of oil is contained therein and the sediment or solid matter contained in the oil entering the chamber is permitted to settle under the influence of gravity to the bottom thereof, whence it may pass through the pipe 5 to the bottom of the collecting tank 6 which may contain sufficient oil to cover the bottom of the pipe 5.

Upon the upper end of the settling chamber 4 is mounted another cylindrical chamber 7, separated from the chamber 4 by means of the plate 8, said plate being provided with an opening through which the end of the pipe 9 projects for communication with chamber 4. The upper end of the pipe 9 is open so that if the oil is forced upwardly through the pipe 9 it may overflow into the surrounding chamber 7. The chamber 7 is connected by means of the conduit 10 with the header 11 which serves to distribute the oil to the passages of the second section of the still.

As will be observed, the liquid contained in the chamber 4 and pipe 9 forms a head of liquid of sufficient weight to balance the difference between atmospheric pressure acting on the surface of the oil contained in tank 6 and the reduced pressure or vacuum maintained in the still proper. The length of the pipe 9 may be calculated to provide any necessary head of liquid depending upon the particular vacuum which it is desired to use.

In order to permit a certain degree of flexibility, however, and to permit different degrees of vacuum to be used if desired, means are provided by which the effective head of liquid may be changed.

In the preferred embodiment illustrated the chamber 4 is provided with a passage 12 which is connected by a plurality of passages 13, 13$^a$ and 13$^b$ having valves 14, 14$^a$ and 14$^b$ arranged therein. If all of the valves 14, 14$^a$ and 14$^b$ are closed, the liquid is forced to ascend the entire length of the pipe 9 before it can overflow for passage to the next still section. If, however, the valve 14$^b$, for instance, is opened, the oil is by-passed through the conduits 12 and 13$^b$ and the effective head of liquid is thereby reduced somewhat. By opening valves 14$^a$ or 14 the head of liquid may be similarly reduced to an even greater extent.

The pump 2 may preferably be of the centrifugal type due to the fact that sediment and solid matter may pass therethrough without appreciable wear, although under certain conditions rotary pumps of various types may be used. The pump may be arranged below the level of the header which discharges thereto, in order to provide a gravity flow to the pump.

If desired, a cooling coil 16 may be arranged in the cooling tank 6 in order that the oil contained therein may be maintained at a sufficiently low temperature to prevent danger from fire.

It may also be desirable to insert a check valve 15 in the conduit 3 in order that if, for any reason, the pump 2 should fail, the oil contained in the chamber 4 will not be drawn back through the conduit 1 to flood the lower passages of the first section of the still.

The sediment and soda coke collected in the tank 6 may either be removed manually as by hoeing or a suitable endless conveyor (not shown) may be arranged in the tank and may be driven by suitable means to discharge the solid matter outside the tank.

As will be observed, if either the vacuum applied to the still or atmospheric pressure varies, the level of the liquid in the collecting tank will rise and fall to compensate for such variations. For instance, if atmospheric pressure rises, liquid is forced from the collecting tank through the separator and into the still, thus reducing the level of the liquid in the tank and thereby increasing the length of the head of liquid whereby the additional pressure is compensated. On the other hand, if the vaccum maintained in the still is decreased, additional oil flows into the collecting tank through conduit 3, the level rises and the length of the head of liquid is decreased. If the change in the vacuum maintained in the still is sufficient, one of the valves 14, 14$^a$ and 14$^b$ may be opened to permit the oil to by-pass to thereby decrease the length of the head of liquid.

It is to be understood that the invention may be variously modified and embodied within the scope of the subjoined claims.

I claim as my invention:

1. In a multi-unit still for the continuous distillation of hydrocarbon oils under vacuum, means forming a continuous passage for oil from one still unit to another, means interposed in said passage for separating sediment from the oil, and means forming an open conduit from said separating means to the atmosphere for the removal of collected sediment, said conduit being sealed by the oil therein, the said passage, separating means and conduit being of a height sufficient to provide a head of liquid therein equal to the difference between atmospheric pressure and the vacuum maintained in said still.

2. In a multi-unit still for the continuous distillation of hydrocarbon oils under vacuum, means forming a continuous passage for oil from the still unit to another, means interposed in said passage for separating sediment from the oil, a collecting tank and means forming a conduit from said separating means to said collecting tank, said conduit being sealed by the said tank, the oil in said passage, separating means and conduit being of a height sufficient to provide a head of liquid therein equal to the difference between the pressure on the surface of the liquid in said tank and the vacuum in said still.

3. In a still for the continuous distillation of hydrocarbon oils under vacuum, means forming a passage for supplying oil to said still, means interposed in said passage for separating sediment from the oil, and means forming an open conduit from said separating means to the atmosphere for the removal of collected sediment, said conduit being sealed by the oil therein, said passage, separating means and conduit being constructed and arranged to provide a head of liquid equal to the difference between atmospheric pressure and the vacuum in said still.

In testimony whereof, I have signed my name to this specification this 12th day of November, 1925.

JOHN A. GIBB.

CERTIFICATE OF CORRECTION.

Patent No. 1,755,778.                                  Granted April 22, 1930, to

JOHN A. GIBB.

It is hereby certified that error appears in the printed specification of the above numbered patent requiring correction as follows: Page 2, line 98, claim 2, strike out the words "oil in" and insert the same to follow after the article "the" first occurrence in the same line; and that the said Letters Patent should be read with this correction therein that the same may conform to the record of the case in the Patent Office.

Signed and sealed this 20th day of May, A. D. 1930.

(Seal)                                                                   M. J. Moore,
Acting Commissioner of Patents.